(12) United States Patent
Burke

(10) Patent No.: US 6,186,571 B1
(45) Date of Patent: Feb. 13, 2001

(54) VEHICLE RACKING SYSTEM

(76) Inventor: Malcolm Robert Burke, 94 McKillop Street, Rothwell, QLD (AU), 4022

(*) Notice: Under 35 U.S.C. 154(b), the term of this patent shall be extended for 0 days.

(21) Appl. No.: 09/220,280

(22) Filed: Dec. 23, 1998

(51) Int. Cl.[7] ........................ B60P 3/00
(52) U.S. Cl. ................. 296/3; 296/36; 224/405
(58) Field of Search ............. 296/3, 36; 224/405

(56) References Cited

U.S. PATENT DOCUMENTS

| | | | |
|---|---|---|---|
| 3,891,262 | 6/1975 | Brunel | 296/3 |
| 4,398,763 | 8/1983 | Louw | 296/3 |
| 4,604,013 | 8/1986 | Elwell et al. | 410/106 |
| 4,659,131 | 4/1987 | Flournoy, Jr. | 296/3 |
| 4,770,458 | 9/1988 | Burke et al. | 296/3 |
| 4,854,628 | 8/1989 | Halberg | 296/3 |
| 5,002,324 | 3/1991 | Griffin | 296/3 |
| 5,009,457 | 4/1991 | Hall | 296/3 |
| 5,037,152 | 8/1991 | Hendricks | 296/3 |
| 5,108,141 | 4/1992 | Anderson | 296/3 |
| 5,143,415 | 9/1992 | Boudah | 296/3 |
| 5,152,570 | 10/1992 | Hood | 296/3 |
| 5,190,337 | 3/1993 | McDaniel | 296/3 |
| 5,431,472 * | 7/1995 | Coffland | 296/3 |
| 5,439,152 | 8/1995 | Campbell | 224/405 |

FOREIGN PATENT DOCUMENTS

74056/96 * 1/1998 (AU).

* cited by examiner

Primary Examiner—D. Glenn Dayoan
Assistant Examiner—Patricia Engle
(74) Attorney, Agent, or Firm—Woodard, Emhardt, Naughton, Moriarty & McNett

(57) ABSTRACT

A racking system (10) for a pick up vehicle (21) including a pair of side frames (11) which are each mountable to an associated side wall (20) of the pick up vehicle (21) including one or more tie bars (16, 17, 18) and which side frames (11) are each pivotable about a longitudinal axis from an extended position to a lowered position and a pair of end frames (12) wherein each end frame (12) is releasably attachable to respective ends (37) of the pair of side frames (11) wherein the racking system (10) is self-bracing in the extended position.

15 Claims, 9 Drawing Sheets

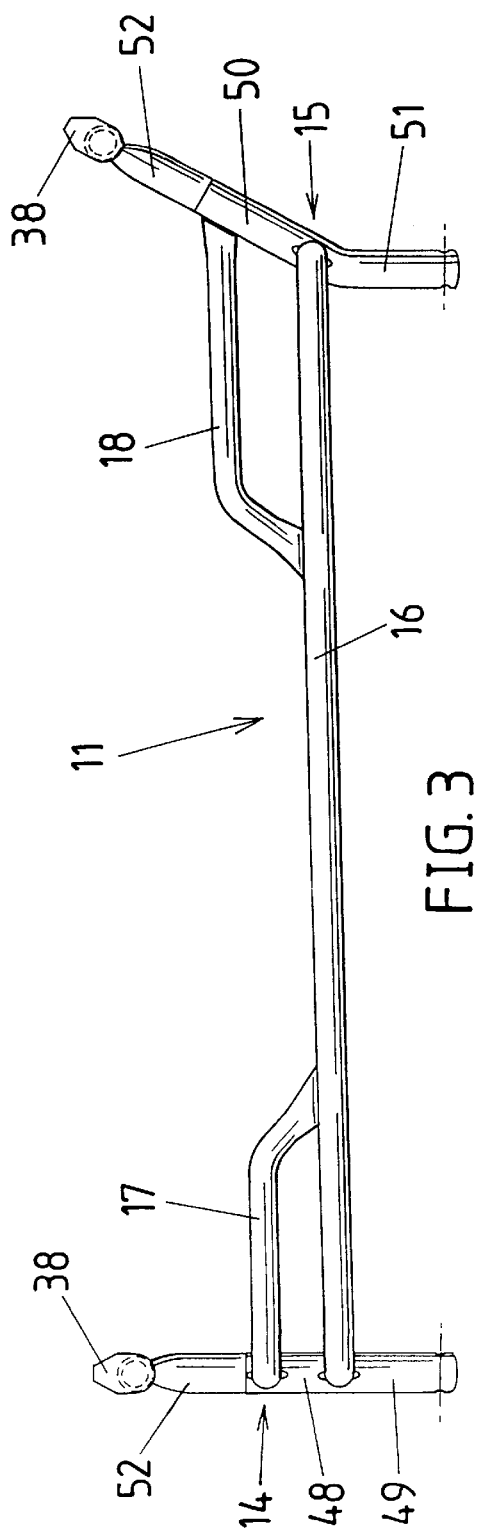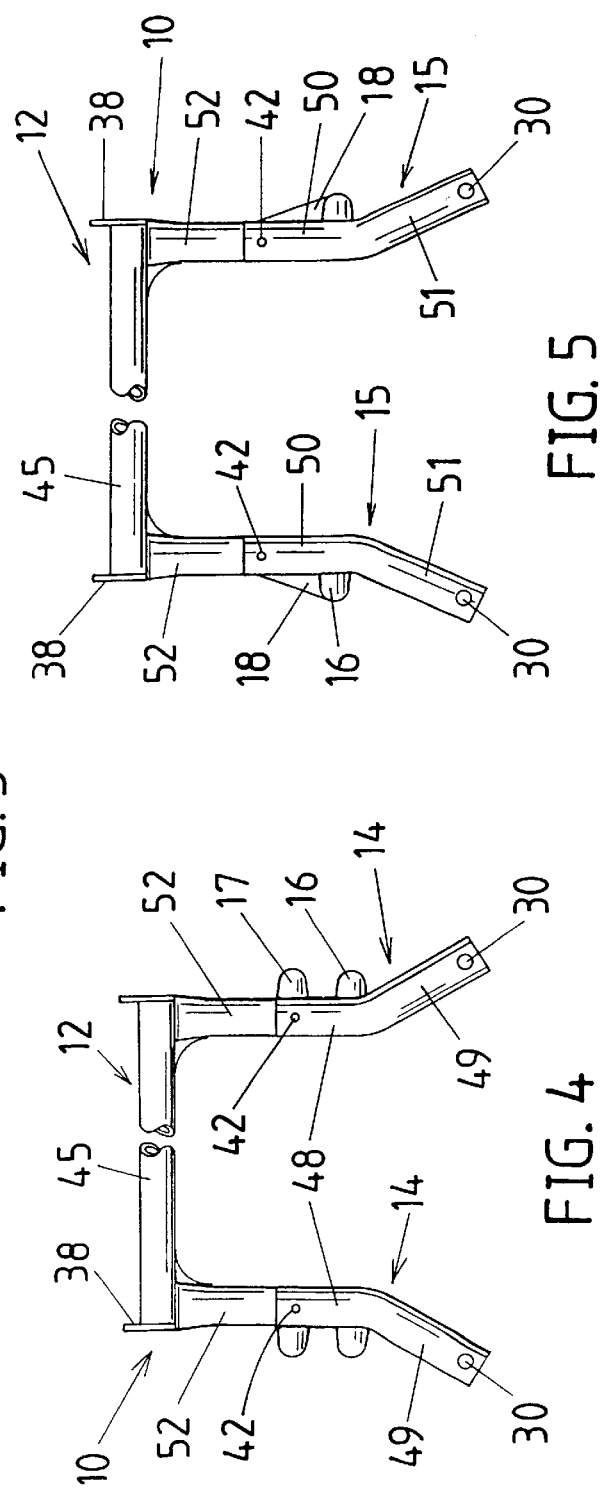

VEHICLE RACKING SYSTEM

BACKGROUND OF THE INVENTION

1. Technical Field

THIS INVENTION relates to a racking system for vehicles and, in particular, utility vehicles or pick up vehicles inclusive of pick up trucks.

2. Background

Reference may be made to conventional racking systems for pick up trucks as described, for example, in U.S. Pat. No. 5,431,472. This reference describes a pair of end frames which are each attached to opposed support brackets located on an upper edge respectively of an associated side wall of a body of the pick up truck. There is also provided a retaining bracket on the upper edge of each side wall which is located intermediate a pair of the support brackets attached to a common side wall. The end frames may pivot from an upper operative position to a lower inoperative position whereby each end frame engages with an adjacent retaining bracket.

Reference may also be made to conventional pick up truck racking systems which are described in U.S. Pat. Nos. 4,398,763, 4,604,013, 4,659,131, 5,002,324, 5,009,457, 5,037,152, 5,108,141 and 5,143,415 which all have a feature that is common with U.S. Pat. No. 5,431,472 in that individual frame members or frame components of each racking system are supported on one or each side edge of opposed side walls of the body of the pick up truck.

The adoption of the abovementioned common feature provides a marked disadvantage in that it is not possible to utilise a tonneau cover for weather proofing purposes in regard to the pick up vehicle unless the mounting brackets or other mounting arrangements for the frame members or frame components of the prior art references are removed to facilitate attachment of the tonneau cover to each upper edge of opposed side walls of the pick up truck. It can be appreciated that such removal is time consuming and may be labour intensive unless it is desired to dispense with use of a tonneau cover permanently by making the mounting brackets or other form of mounting arrangements in the form of permanent attachments to each side wall of the pick up truck.

Another disadvantage of these references is that no effective use could be made of the racking system for storage or carrying purposes when the racking system was moved to an inoperative or folded position.

Reference also may be made to U.S. Pat. No. 5,439,152 which refers to an extendable racking system which is intended to be attached to a bed or tray of the pick up truck wherein there is provided a base frame comprising four end uprights, end frame members and opposed side frame members which were adjustable in length. The base frame also incorporated a pair of end frames adjustably and releasably attached to a respective pair of end uprights, Manufacture of such a racking system was relatively expensive due to the relatively complicated structure of the racking system. Installation and dismantling of the racking system in relation to individual pick up trucks was also time consuming and labour intensive. There was also no provision for use of a tonneau cover for weather proofing purposes when the racking system was moved to an inoperative position. Another disadvantage of this reference is that no effective use could be made of the racking system for storage or carrying purposes when the racking system was moved to a lowered or folded position.

Similar problems occurred with racking systems of a generally similar nature to that described above In relation to U.S. Pat. No. 5,439,152 which are disclosed in U.S. Pat. Nos. 3,460,8654, 4,659,131, 4,770,558, 4,854,628, 5,152, 570 and 5,190,337.

U.S. Pat. No. 3,891,262 refers to a racking system for a pick up vehicle which incorporates a pair of pivotally mounted end frames movable from a horizontally folded position to an upright carrying system. Each end frame has a releasable locking brace rigidly holding the end frame in an upright position. Each frame is releasably attached to a load bed or tray of the pick up truck.

However, while the frame structure of this reference is simple in nature, the racking system when moved to the inoperative position could not be effectively used for storage or storage of articles and especially when use was made of a tonneau cover for weatherproofing purposes.

OBJECT OF THE INVENTION

It therefore is an object of the present invention to provide a racking system for a pick up vehicle which may alleviate, to some extent, one or more of the abovementioned disadvantages of the prior art.

DISCLOSURE OF INVENTION

The racking system of the invention includes a pair of side frames which are mountable to a side wall of the pick up vehicle including one or more tie bars and which side frames are each pivotable about a longitudinal axis from an extended position to a lowered position. There also may be utilised one or more end frames wherein the or each end frame is releasably attachable to respective ends of the pair of side frames to provide a self-bracing racking system when in the operative position.

Each side frame may comprise a pair of uprights and one or more longitudinal members which may constitute tie bars for support of articles carried by the pick up vehicle. Preferably each upright defines an end of the side frame and each upright may be pivotally attached to an adjacent side wall of the pick up vehicle by pivotal attachment means. Preferably such pivotal attachment means includes a pivot bracket attached to an internal surface of each side wall adjacent a corner of the pick up vehicle. Each upright may be attached to a respective pivot bracket by an appropriate pivot joint such as pivot pin or alternatively, use may be made of a suitable hinge mechanism.

Each end frame may also include one or more transverse frame members or tie bars which are bounded by a pair of end uprights. Each end upright may be releasably attached to an associated upright of each side frame and this may be accomplished by use of any suitable releasable attachment means such as by a screw-threaded interconnection or telescopic interconnection. Preferably there are provided one or more pairs of opposed apertures in each upright of the side frame which may be aligned with corresponding apertures in the end upright of each end frame and retained in place by use of an appropriate fastener.

BRIEF DESCRIPTION OF THE DRAWINGS

Reference is made to a preferred embodiment of the invention as shown in the attached drawings, in which:

FIG. 3 is a side view of the side frame of the racking system shown in FIG. 1;

FIG. 4 is a rear end view of the racking system shown in FIG. 1;

FIG. 5 is a front end view of the racking system shown in FIG. 1;

BEST MODE FOR CARRYING OUT INVENTION

Figure 2:
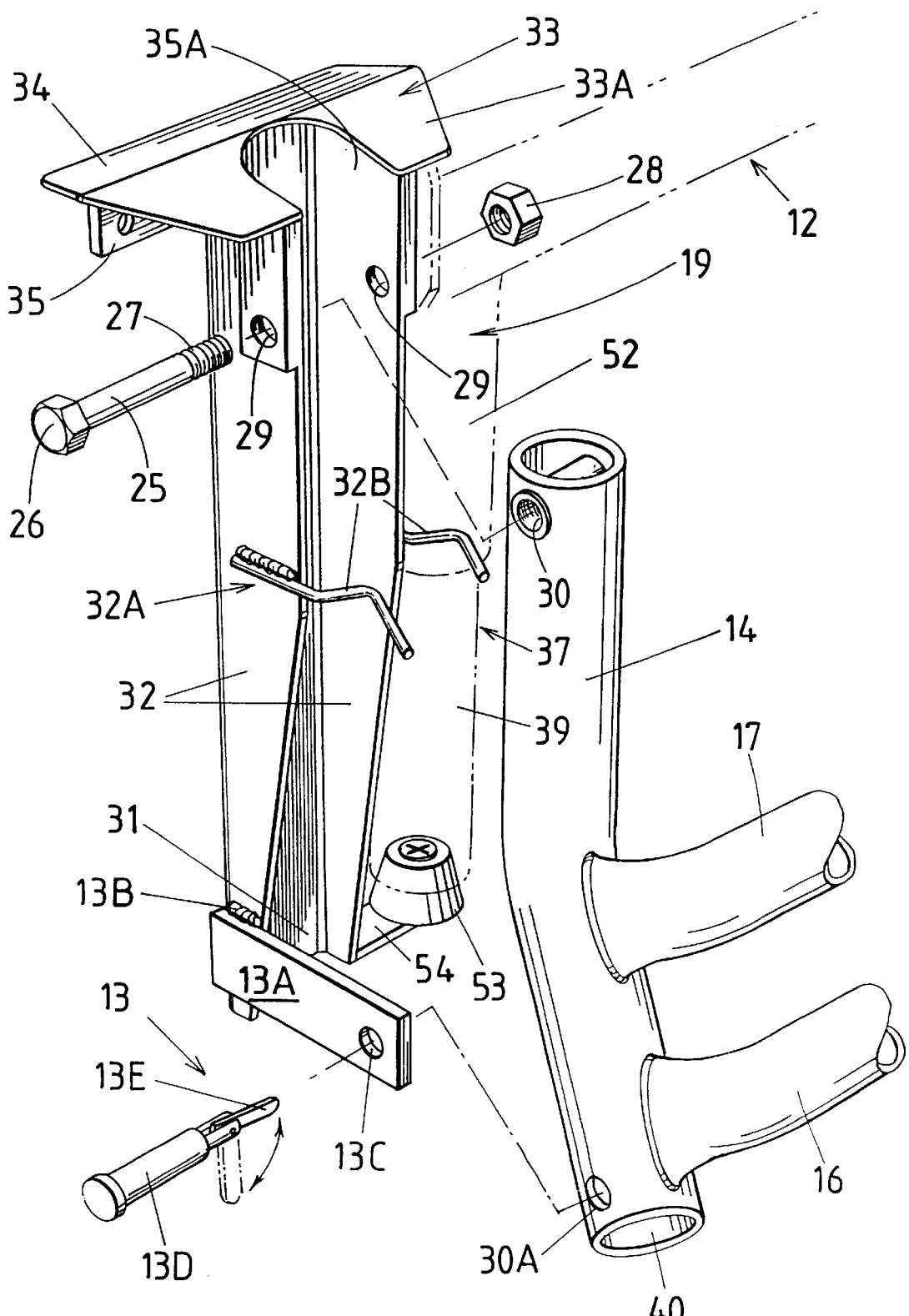
FIG. 2 is a detailed perspective view of the pivotal attachment of each upright to the vehicle of the opposed side frames of the racking system shown in FIG. 1.

In the drawings, there is shown a racking system 10 comprising a pair of opposed side frames 11 and a pair of end frames 12. Each side frame 11 includes uprights 14 and 15 as well as tie bars 16, 17 and 18. Each upright 14 and 15 is pivotally attached to an associated pivot bracket 19 which is attached to an adjacent side wall 20 of vehicle 21. Vehicle 21 also Includes end wall 22, ground engaging wheels 23 and bumper bar 24. Each pivot bracket 19 has a pivot pin 25 having a head 26 and a screw-threaded portion 27 which is engageable with a nut 28. Pivot pin 25 is insertable through opposed apertures 29 of pivot bracket 19 as well as a tubular bush 30 of an associated upright 14 or 15 as best shown in FIG. 2. Pivot bracket 19 includes web 31, opposed flanges 32 and a top ledge component 33 having a flange 34 which engages with an adjoining top surface 36 of side wall 20 of vehicle 21. There is also provided a downwardly extending flange 35 which, when pivot bracket 19 is attached to the side wall 20, is closely adjacent or abuts internal surface 34A of side wall 20. Top ledge component 33 also includes an inner flange 33A which includes a recess 35A to retain upright 14 as best shown in FIG. 2.

End frames 12 include upright components 37 and end plates 38. Each upright component 37 includes a restricted lower portion 39 which fits telescopically into an inner bore 40 of uprights 14 and 15. There also may be provided opposed apertures 41 of lower portion 39 which may be aligned with opposed apertures 42 of uprights 14 and 15 wherein a fastener (not shown) such as a screw and nut may be inserted to effect securing of lower portion 39 within inner bore 40.

As best shown in FIG. 2, there is also provided a locking or securing mechanism 13 comprising a bracket 13A welded to flange 32 at 13B, attachment aperture 13C for retention of fastener 13D having a pivotal latch 13E which may pivot from a horizontal release position shown in full outline to a locking position shown in phantom. In this regard, latch 13E may pass through aperture 13C and aligned aperture 30A before being pivoted to the locking position. There is also provided retaining clip 32A having inwardly biassed resilient arms 32B for retaining upright 14 in the inoperative position.

As best shown in FIGS. 3–4, each upright 14 of side frame 11 includes a vertical portion 48 and an angled portion 49.

Each upright 15 also includes angled portions 50 and 51. Also as best shown in FIGS. 4–5, the upright components 37 of each end frame 12 includes an upper portion 52 as well as restricted lower portion 39.

Figure 1:
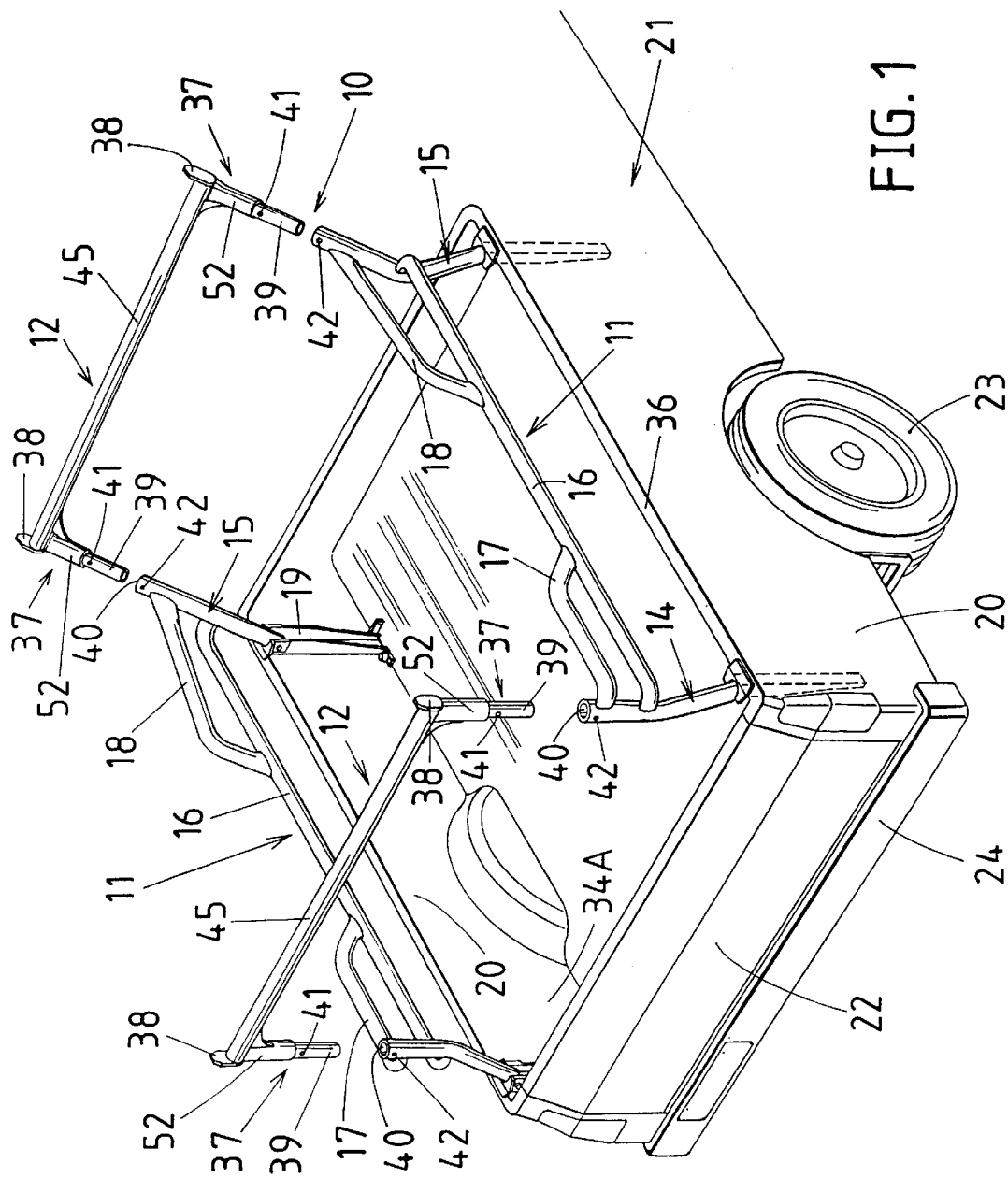
FIG. 1 is an exploded perspective view of the racking system of the invention fitted to a vehicle.
Figure 6:
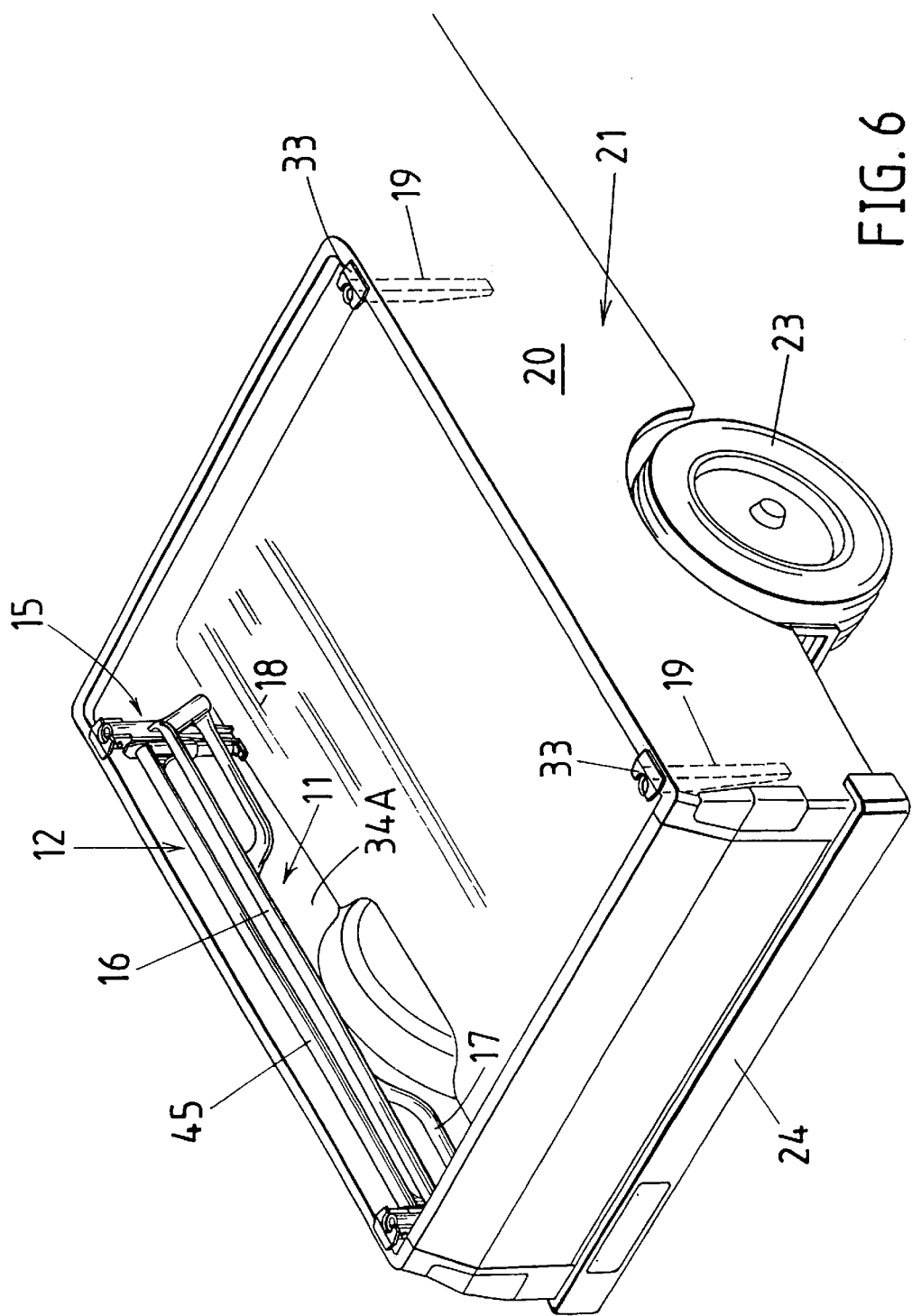
FIG. 6 is a similar view to FIG. 1 showing each side frame in a lowered position and each end frame in a stored position located behind an adjacent side frame.

The operation of the racking system of the invention is clearly shown in FIG. 6 wherein upon removal of each end frame 12 from each side frame 11, this enables each side frame 11 to be pivoted from an upper or extended position shown in FIG. 1 to a lower position shown in FIG. 6. This also enables each end frame 12 to be stowed behind a proximal side frame 11 and adjacent or abutting each inner surface 34A of side walls 20 of vehicle 21. In this regard, there is provided location protrusion 53 attached to support web 54 of pivot bracket 19 which engages with an open bottom end of upright component 37 as shown in phantom in FIG. 2.

Figure 7:
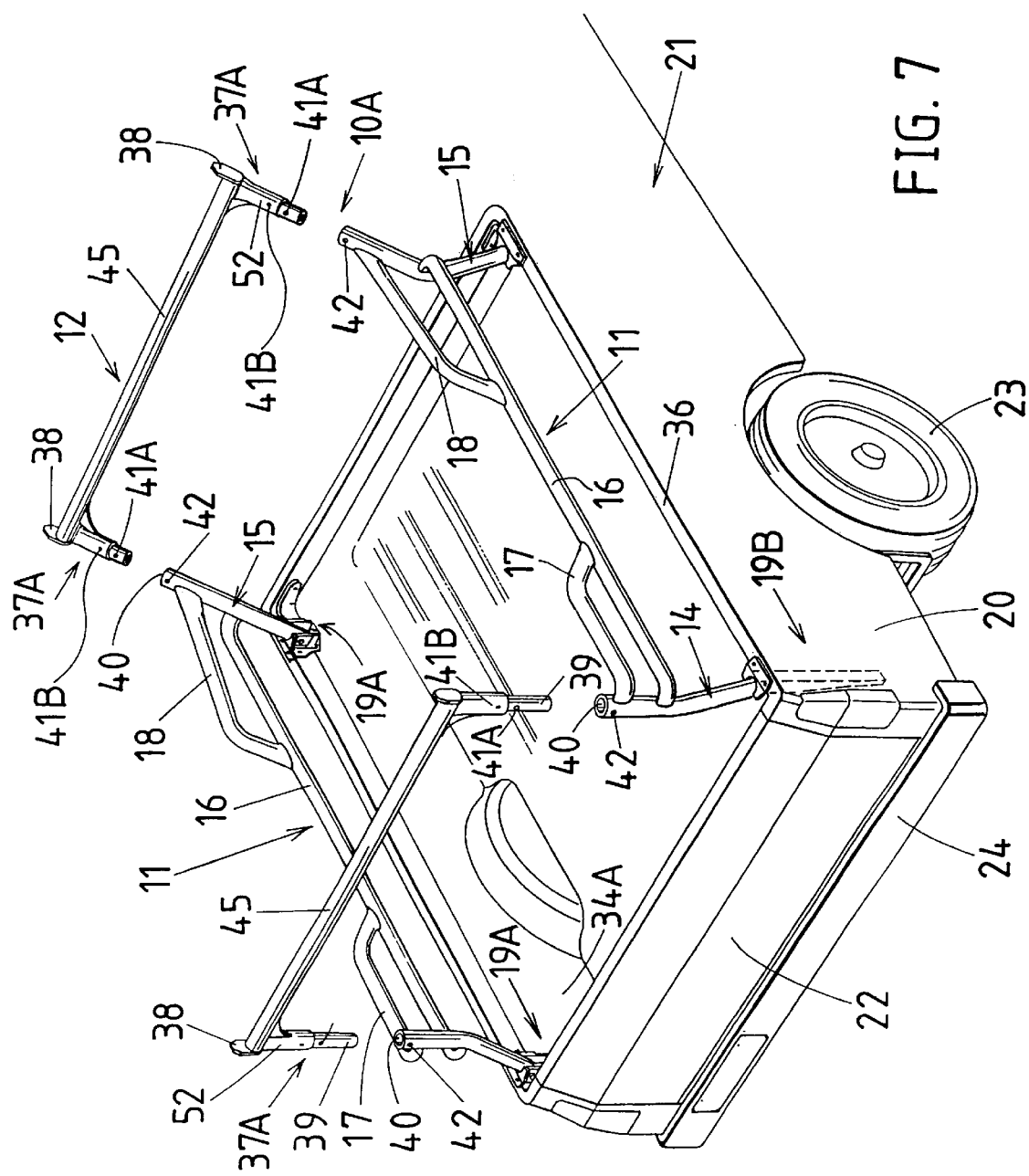
FIG. 7 is an exploded perspective view of another embodiment of the racking system of the invention.

Reference may also be made to another embodiment of the invention shown in FIG. 7 which is very similar to FIG. 1 and therefore, for the most part, similar reference numerals are utilized.

Figure 8:
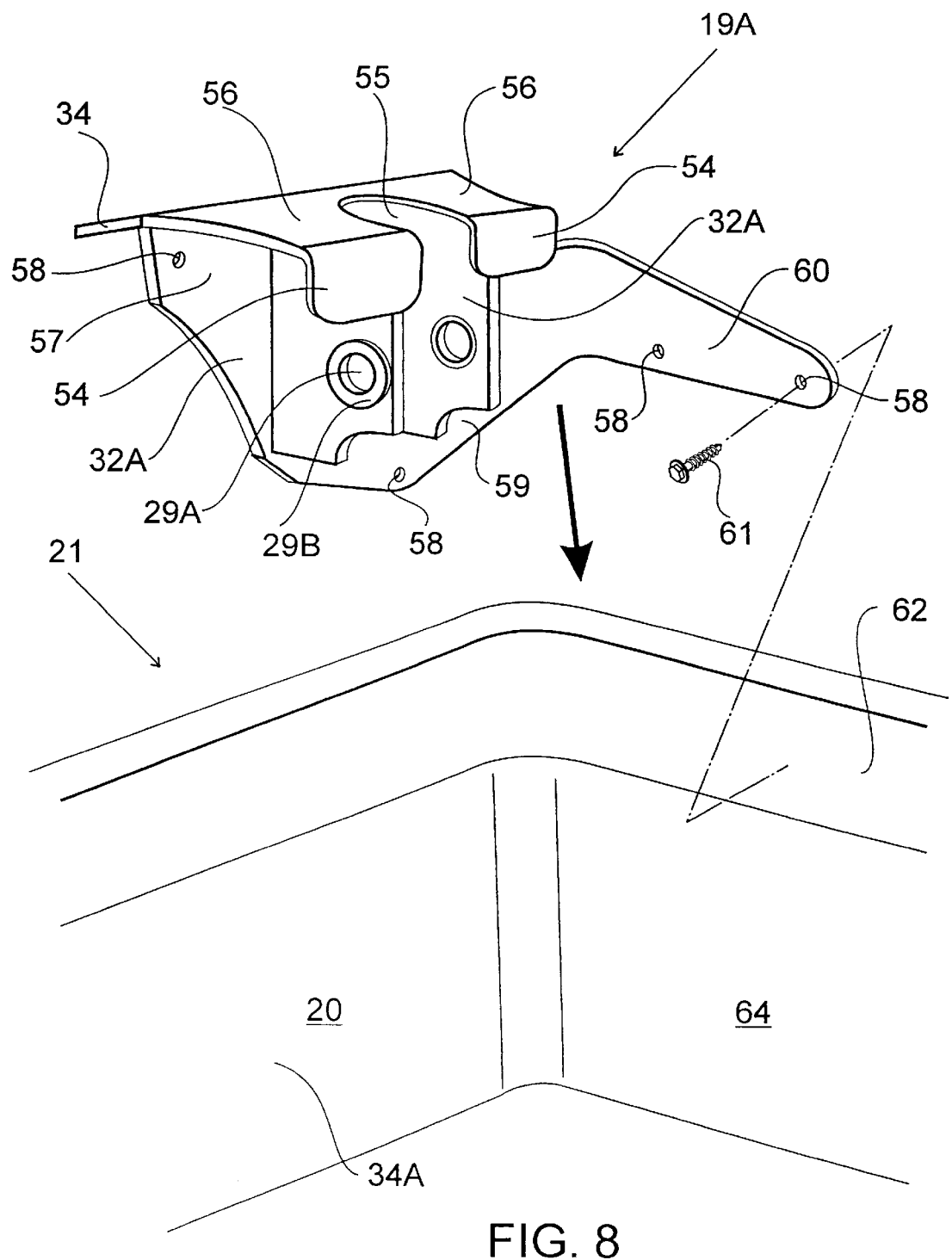
FIG. 8 is a perspective view of a pivot bracket for use with the embodiment of FIG. 7.
Figure 9:
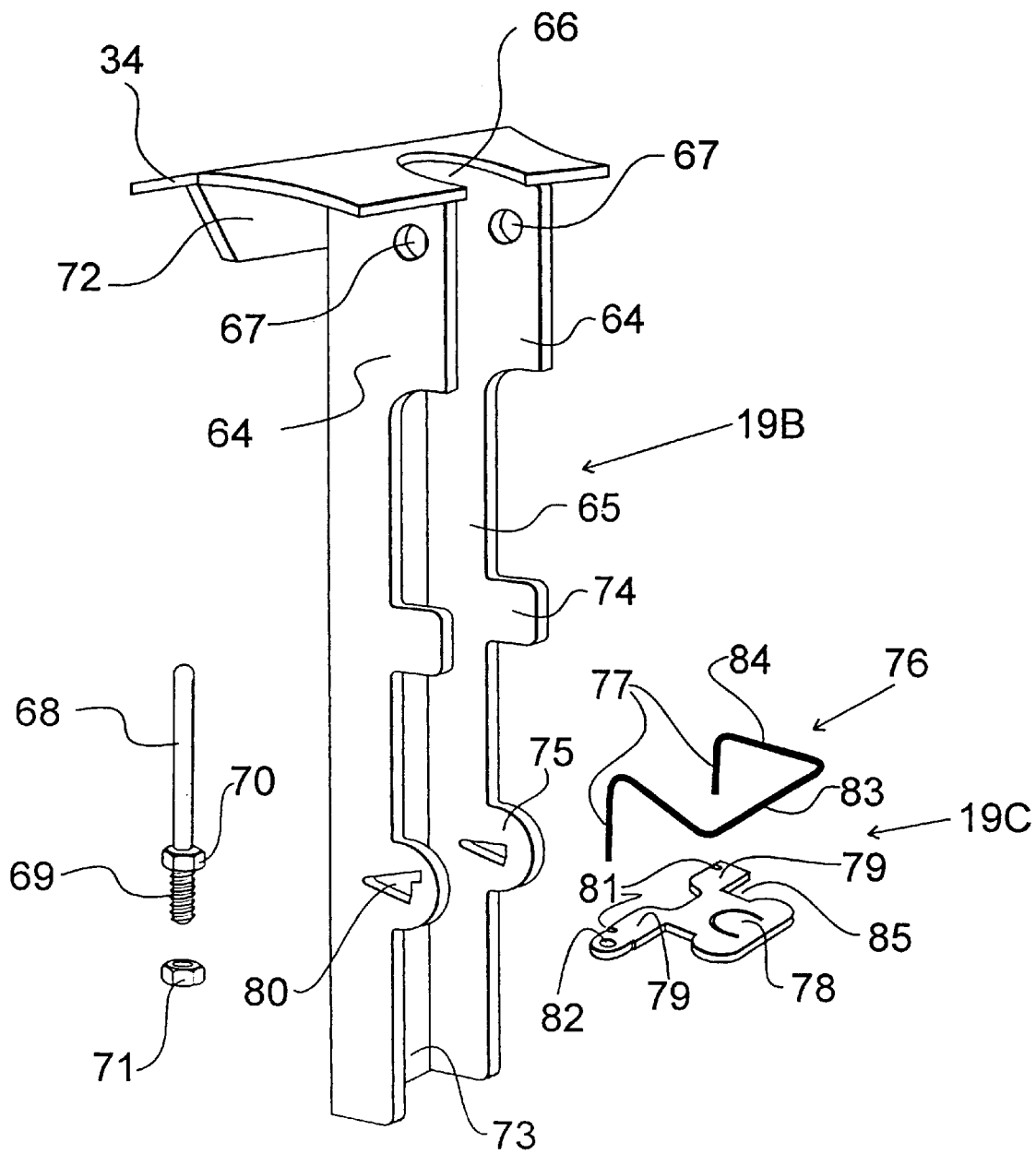
FIG. 9 is a perspective view of another form of pivot bracket for use with the embodiment of FIG. 7.
Figure 10:
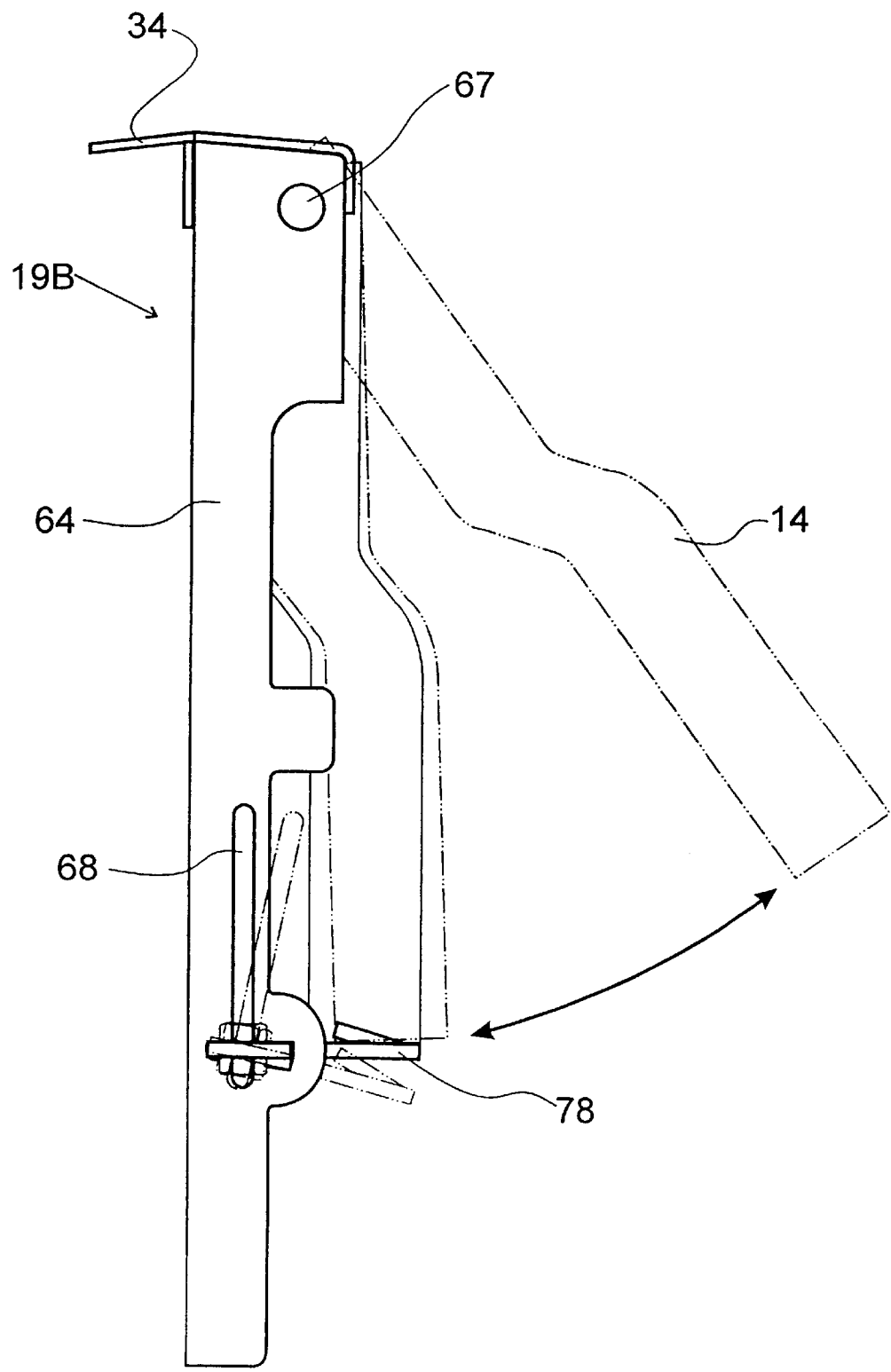
FIG. 10 is a side view showing operation of the embodiment of FIG. 9.

However, there is utilized a different form of pivot bracket 19A shown in more detail in FIG. 8 and a resilient clip assembly 19B shown in more detail in FIGS. 9 and 10 There is also shown a different releasable attachment means 10A between each end frame 12 and adjacent side frames 11.

In FIG. 8, there is shown a modified pivot bracket 19A having opposed pivot apertures 29A having annular strengthening ribs 29B for insertion of pivot pin 25, recess 55 for retention of upright 14, opposed flanges 32A, downwardly extending parts 54 and upper horizontal webs 56 which each bound recess 55 as shown. There is also provided attachment plates 57, 59 and 60 having attachment apertures 58 for retention of associated fasteners 61 for attachment to ledge 62 of side wall 20 and end wall 64 of vehicle 21. In FIG. 1, ledge 62 has been omitted for convenience.

In FIGS. 9–10, there is shown a resilient clip assembly 19C for use with an associated pivot bracket 19B which may be utilized to attach an associated upright 14 or 15 as the case may be to vehicle 21. For convenience, reference is made in FIGS. 9–10 to upright 14.

As shown In FIG. 9, the bracket 19B has opposed flanges 64, and which also has an internal space 65 for retention of an associated upright 14. There is also provided an upper recess 66 which also receives upright 14, opposed apertures 67 for retention of a pivot pin (not shown). There is also provided attachment flange 72 for bearing against an adjacent surface of vehicle 21. There is also shown web 73. Each flange 64 has opposed projections 74 and 75.

Resilient clip assembly 19C includes a spring clip 76 which has a pair of legs 77 which are biassed away from each other. There is also shown a clip support 78 having engagement projections 79 which are inserted through opposed apertures 80 located in each projection 75. Each leg 77 of clip 76 extends through an adjacent notch 81 of clip support 78. There is also provided a control pin 68 which has a spring 69 interposed between spring mount 70 and nut 70.

In use, the control pin 68 is attached to clip support 78 through attachment aperture 82 by nut 71 engaging pin 68 whereby spring 69 provides the control pin 68 with a bias towards the upright position shown in full outline in FIG. 10. The clip 76 may have a web 83 which engages the underside of clip support 78 and whereby opposed parts 84 extend through opposed notches 85.

The operation of clip assembly 19C is shown in FIG. 10 wherein upright 14 may be pivoted from a position shown in phantom by the arrow to a position shown in full outline wherein the upright 14 is held in a retracted position similar to that shown in FIG. 6. It will also be noted that pivoting of control pin 68 towards the position shown in phantom releases upright 14 for movement towards the normally upright operation position.

Figure 11:
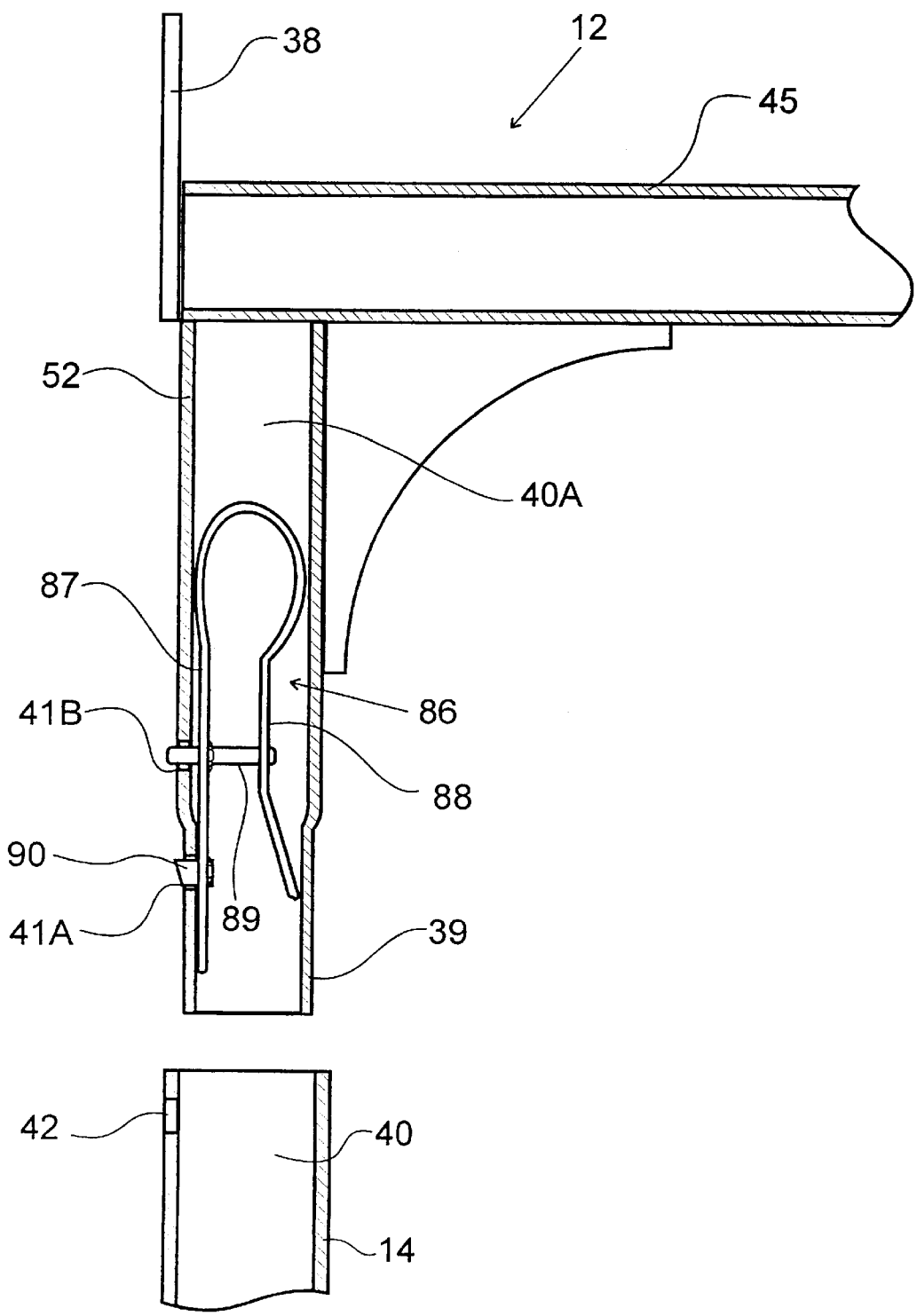
FIG. 11 Is a sectional view showing an alternative releasable attachment means between each upright and an upright of an adjacent end frame.

In FIG. 11, there is shown an alternative releasable attachment means between end frames 12 and each side frame 11. Instead of using fasteners which are inserted between opposed apertures 41 and 42 as shown in FIG. 1, there is provided a resilient clip or spring 86 which is inserted into the hollow bore 40A of upright 14 and 15. Clip 86 has leg 87 and 88 which are biassed toward each other and thus retain clip 86 within bore 40A as shown. There Is also provided a projection 89 which is attached to each leg 87 and 88 and another projection 90 which is attached to leg 87. Projection 89 extends through aperture 41B and projection 90 extends through aperture 41A. It will be noted in FIG. 7 that end frame 12 fits into an associated upright 14 (or 15 as the case may be) by spigot 39 fitting into hollow bore 40 and being retained therein by projection 90 extending through aperture 42 of upright 14. Upon pressure upon projection 89, this will then release spigot 39 from engagement with upright 14.

Advantages of the racking system of the invention, as will be apparent from the abovementioned preferred embodiment, include the following:

(i) the racking system of the invention includes tie bars or each side frame which may be used for attachment of articles which are to be carried by the pick up truck whether in the extended position or in the lowered position;

(ii) when the racking system of the invention is in the lowered position, as shown In FIG. 6, a tonneau cover for waterproofing purposes may be attached to the upper side edge of each opposed side wall of the pick up truck because the entire racking system in the lowered position is located beneath the upper side edge;

(iii) each end frame may be rapidly disconnected from each of the side frames and stored in a storage position behind an adjacent side frame in the lowered position as shown, for example, in FIG. 6;

(iv) the racking system of the invention is completely demountable and may be sold in kit form;

(v) the racking system of the invention by its design prevents any movement of loads in a forward or rearward direction because articles carried by the pick up truck may be attached to longitudinal tie bars in the extended or lowered position;

(vi) installation of the racking system to an existing pick up vehicle can be carried out by using conventional tools and by an inexperienced installer;

(vii) the racking system of the invention can be fitted to a variety of different pick up vehicles or may be transferred from one vehicle to another in minimum time;

(viii) the racking system is of a strong self-bracing design by the attachment of each end frame to the pair of side frames whereby the load is spread equally over the side walls and bed of the pick up vehicle; and (ix) the racking system can utilise a tonneau cover with only minor modifications when each side frame is in the extended position.

What is claimed is:

1. A racking system for a pick up vehicle including:

(i) a pair of side frames which are each mountable to an associated side wall of the pick up vehicle wherein each side frame includes a pair of end uprights and including one or more tie bars interconnecting each of said end uprights and which side frames are each pivotable about a longitudinal axis from an extended to a lowered position; and (ii) a pair of end frames wherein each end frame is releasably attachable to respective ends of the pair of side frames wherein there is provided releasable attachment means between each end upright of the side frames and an adjacent end upright of each of the end frames, said releasable attachment means comprising telescopic engagement between said respective end uprights, wherein said racking system is self-bracing in the extended position, and wherein each end frame includes a pair of end uprights and one or more tie bars interconnecting said end uprights.

2. A racking system as claimed in claim 1 wherein said releasable attachment means further comprises two pairs of co-aligned apertures which are each engaged by a fastener.

3. A racking system as claimed in claim 1 wherein each end upright of the end frames includes a lower part of restricted transverse dimensions compared to an upper part for engagement with an inner bore of an adjacent end upright of each of the side frames.

4. A racking system as claimed in claim 3, wherein there is provided a resilient clip assembly in a bore of each end upright of the end frames having at least one locking projection which extends through a mating aperture in each end upright of the side frames.

5. A racking system as claimed in claim 4, wherein said resilient clip assembly includes two locking projections whereby inward movement of one locking projection releases adjacent end uprights of the end frames from attachment to an associated end upright of the side frames.

6. A racking system as claimed in claim 1, wherein each of said side frames are pivotally attached to a pivot bracket attachable to the adjacent side wall of a pick up vehicle by a pivot joint.

7. A racking system as claimed in claim 6, wherein there is provided a locking mechanism for locking an adjacent end upright of each side frame when in the lowered position, wherein the locking mechanism is located within an associated pivot bracket which resiliently engages said adjacent end upright in the locked position.

8. A racking system as claimed in claim 7, wherein the locking mechanism is a resilient clip assembly attached to the associated pivot bracket.

9. A racking system as claimed in claim 8, wherein there is provided a control member attached to the resilient clip assembly which, upon movement, frees each upright of the side frame from said lowered position.

10. A racking system for a pick-up vehicle including:

(i) a pair of side frames which are each mountable to an associated side wall of the pick up vehicle including a pair of end uprights and one or more tie bars interconnecting each of said end uprights and which side frames are pivotable from an extended position to a lowered position adjacent to and substantially parallel with the associated side wall; and (ii) a pair of end frames wherein each end frame is releasably attachable to respective ends of the pair of side frames wherein each end frame includes a pair of end uprights and one or more tie bars interconnecting said end uprights, wherein there is provided releasable attachment means between each end upright of the side frames and an adjacent end upright of each of the end frames, said releasable attachment means comprising telescopic engagement between said respective end uprights wherein said racking system is self bracing in the extended position.

11. A racking system as claimed in claim 10, wherein said releasable attachment means further comprises two pairs of co-aligned apertures which are each engaged by a fastener.

12. A racking system as claimed in claim 11, wherein each end upright of the end frames includes a lower part of restricted transverse dimensions compared to an upper part for engagement with an inner bore of an adjacent end upright of each of the side frames.

13. A racking system as claimed in claim 10, wherein each of said side frames are pivotally attached to a pivot bracket attachable to the adjacent side wall of a pick up vehicle by a pivot joint.

14. A racking system as claimed in claim 13, wherein the pivot bracket when attached to said side wall extends from a load bed of the pick up vehicle to an upper edge of the side wall.

15. A racking system as claimed in claim 13, wherein there is provided a locking mechanism for locking an adjacent end upright of each side frame when in the lowered position.

* * * * *